(12) United States Patent
Quinta Cortinas

(10) Patent No.: US 8,920,061 B2
(45) Date of Patent: Dec. 30, 2014

(54) SHOCK-ABSORBING COUPLING FOR FLOATING STRUCTURES

(75) Inventor: Andres Quinta Cortinas, Pontevedra (ES)

(73) Assignee: Espanola de Plataformas Marinas, S.L., Ponteverdra (ES)

( * ) Notice: Subject to any disclaimer, the term of this patent is extended or adjusted under 35 U.S.C. 154(b) by 0 days.

(21) Appl. No.: 14/003,513

(22) PCT Filed: Mar. 8, 2012

(86) PCT No.: PCT/ES2012/070155
§ 371 (c)(1),
(2), (4) Date: Sep. 6, 2013

(87) PCT Pub. No.: WO2012/120180
PCT Pub. Date: Sep. 13, 2012

(65) Prior Publication Data
US 2013/0340376 A1   Dec. 26, 2013

(30) Foreign Application Priority Data

Mar. 9, 2011 (ES) .................................. 201130323

(51) Int. Cl.
*A01K 61/00* (2006.01)
*F16C 11/00* (2006.01)
*E04B 1/58* (2006.01)
*B63B 3/08* (2006.01)
*B63B 17/00* (2006.01)
*B63B 35/613* (2006.01)

(52) U.S. Cl.
CPC . *E04B 1/585* (2013.01); *B63B 3/08* (2013.01); *B63B 17/0081* (2013.01); *B63B 35/613* (2013.01); *B63B 2221/20* (2013.01)
USPC ............ 403/220; 119/223; 114/266; 405/220

(58) Field of Classification Search
USPC ......... 52/655.1, 396.06; 119/223; 405/26, 27, 405/70, 71, 63, 219, 220; 403/220, 392, 403/396, 391, 390, 286; 114/266, 264, 263
See application file for complete search history.

(56) References Cited

U.S. PATENT DOCUMENTS

| | | | | |
|---|---|---|---|---|
| 1,026,063 | A * | 5/1912 | Watkins | 213/220 |
| 3,557,564 | A * | 1/1971 | Hauber | 405/169 |
| 3,884,042 | A | 5/1975 | Anderson et al. | |
| 3,984,987 | A * | 10/1976 | Light, Jr. | 405/63 |
| 4,073,143 | A * | 2/1978 | Preus | 405/70 |

(Continued)

FOREIGN PATENT DOCUMENTS

| | | |
|---|---|---|
| ES | 2145727 A1 | 7/2000 |
| ES | 2223255 A1 | 2/2005 |
| WO | 8703170 A1 | 6/1987 |
| WO | 2011045459 A1 | 4/2011 |

*Primary Examiner* — Christine T Cajilig
(74) *Attorney, Agent, or Firm* — Breiner & Breiner, L.L.C.

(57) ABSTRACT

The coupling includes first gripping members which are connected, facing on one and the same level on corresponding mounting bodies, to respective structures, and second gripping members mounted so as to slide vertically on the first gripping members in order to secure pneumatic covers in two diametrically opposed regions thereof with the collaboration of threaded rods. The gripping members and provide retention walls that extend towards the mounting bodies by means of horizontal retention flanges. The second gripping members have walls with holes for the passage of screws during fitting thereof to the mounting bodies.

5 Claims, 2 Drawing Sheets

(56) References Cited

U.S. PATENT DOCUMENTS

| | | | |
|---|---|---|---|
| 4,563,849 A * | 1/1986 | Mangal | 52/235 |
| 5,081,946 A * | 1/1992 | Nannig et al. | 114/264 |
| 5,141,359 A * | 8/1992 | Klockner | 405/26 |
| 5,173,000 A | 12/1992 | Nolan | |
| 5,243,737 A | 9/1993 | Dainat | |
| 5,529,012 A * | 6/1996 | Rytand | 114/263 |
| 6,257,164 B1 * | 7/2001 | Carey, II | 114/263 |
| 6,443,653 B1 * | 9/2002 | Zingale | 405/76 |
| 7,018,126 B2 * | 3/2006 | Henricksen | 403/286 |
| 7,524,139 B2 * | 4/2009 | Bishop | 405/21 |
| 7,887,254 B2 * | 2/2011 | Bishop | 405/26 |
| 8,136,468 B2 * | 3/2012 | Rytand et al. | 114/263 |
| 8,186,121 B2 * | 5/2012 | Dupuis et al. | 52/655.1 |
| 8,327,789 B2 * | 12/2012 | Emch | 114/266 |

* cited by examiner

SHOCK-ABSORBING COUPLING FOR FLOATING STRUCTURES

FIELD OF THE INVENTION

The invention relates to a shock-absorbing coupling for floating structures and is especially intended, although not exclusively, for use in coupling modular structures to make up jetties and other support platforms and, more particularly, it is intended for beds applied to lamellibranch mollusc farming in rough waters or in the open sea. It might as well be used in submerged or submersible structures.

BACKGROUND OF THE INVENTION

It is necessary to absorb movement in structures that need to be adapted to water movement. Such is the case of jetties or other platforms, either passing-through or support platforms, built with independent elements that must be kept together by means of couplings which can buffer the joining thereof.

Moreover, breeding molluscs at ria mouths, in rough waters of large lakes or in the open sea where waves can be considerable, requires farming structures to resist the battering of the sea and the force of underwater currents during storms, or the efforts derived from tugging said structures to their place of use, or both situations at the same time. In addition, in known designs of mollusc farming structures, the breeding ropes hanging from the structures endure abrupt movements, thus causing the detachment of part of the culture.

The stiffness of these structures, together with the heavy loads they support, prevent proper adjustment to the marine environment and, as a better adjustment to the environment is required in the facilities and devices for mollusc farming than in those designed for fish breeding, it has become necessary to design structures intended for this specific type of farming having elongated hollow members or at least with hollow ends interconnected with intermediate flexible modules, as disclosed in document ES2145727.

Document WO8703170, though not intended for mollusc breeding, discloses a floating breeding device for fish and the like including at least one breeding bag which is carried by a cage equipped with floating bodies, which cage consists of a three-dimensional frame consisting of a number of rods composed to polygons, which rods and foreseen interconnecting struts are elastically interconnected between at least some of the joints.

Document EP0358421 discloses the use of a flexible coupling to join frame members into a fence structure for fish breeding, the coupling including first and second mounting means for mounting to respective frame members adjoining in the structure and a flexible body between said first and second mounting means. The rotational and translational movement between adjoining frame members is determined by the material of the flexible body and by two mechanical stops. The coupling includes a mechanical connection between the mounting means in case the flexible body fails.

OBJECT OF THE INVENTION

It is an object of this invention to provide a shock-absorbing coupling for use in passing-through or loading floating structures and in the structures intended for mollusc breeding if required. The coupling is to be built so that its use provides more stability in all structures and better navigable conditions in those intended for breeding, increasing their adaptability above the water surface or submerged, to rough waters or to the battering of waters, in order to accomplish better productivity, reducing or removing culture detachments caused by water movement.

The shock-absorbing coupling for floating structures is intended for easy and lightweight construction, although strong and elastic enough to absorb, without structural deformation, the loads applied in storms and sea currents.

DESCRIPTION OF THE INVENTION

The objects are accomplished, according to the invention, providing a shock-absorbing coupling for floating structures built with two mounting bodies adapted to be respectively inserted in adjoining elements of a structure, and, between them, a number of tyres will be placed and kept horizontal when in use. The amount of couplings to be added to a structure will vary depending on the size of the required elements and structure. Each coupling includes at least one pair of mounting bodies facing each other, preferably two pairs, and between each pair, a tyre or other similar flexible body is placed. A simplified expression of a mounting body has a retention wall that can be conventionally connected by one of its sides to an element of the structure so that it ends up facing another retention wall equally connected to an adjoining element of the structure. The sides of the retention walls that are not connected to the elements of the structure secure support of the gripping members of the tyres.

More particularly, the shock-absorbing coupling is provided with first and second gripping members connected and respectively facing each other at the same level in each said mounting body, so that, between the first and second gripping members connected to one of the mounting bodies facing each other and the first and second gripping members respectively mounted in the mounting body facing them, the tyre is placed so that it is kept between them in diametrically opposite areas thereof with the purpose that the tyres in the shock-absorbing coupling and, therefore, in the structure may bend, stretch or twist freely on their central areas absorbing the movement from waves and sea currents.

The first gripping members are preferred to be welded onto the respective mounting bodies, whereas the second gripping members are preferred to be connected with conventional fastening means, being slidable in vertically elongated holes foreseen in each of said mounting bodies, arranged above and overlapping the first gripping members, so that the second gripping members can accordingly get closer to and farther from the first gripping members in order to secure the tyres in place in the best possible way. The joining elements between them being removed, it is possible to access the tyres for adding or removing them.

Moreover, said first and second gripping members are preferred to be steel plates made up of a retention wall on its front edge, which runs vertically opposite in each gripping member to end up in a respective horizontal retention flange folded inwards. Therefore, as the region next to the internal periphery of the tyre close to the heel is located between the retention walls and flanges of both gripping members, the undesired detachment of the tyre is prevented.

The plate which makes up the first gripping member includes lower ribs which facilitate its welding connection to the support wall in the mounting body.

The second gripping member is foreseen with an attachment wall provided with holes aligned with the elongated holes provided in the support wall of the mounting body for passing the fastening elements through.

In order to restrain tyre expansion, at least any of the first or second gripping members is provided with a retention wall, continuous or not, with its contour adapted to the external periphery of the tyre.

To favour tyre behaviour, the invention proposes that each tyre is fixed, between said first and second gripping member connected to each mounting body, by means of threaded rods passing through the holes respectively provided facing the tyre and the gripping members, the rods being secured with nuts on the outside of the gripping members.

BRIEF DESCRIPTION OF THE DRAWINGS

Going into detail hereinafter, the invention is described in connection with the accompanying drawings, which show an example of a preferred non-limiting embodiment to be used in a mollusc breeding structure and wherein the shock-absorbing coupling for floating structures is preferably illustrated in a position before and after mounting, in this model, on two hollow components belonging to structure frames facing each other.

DESCRIPTION OF AN EMBODIMENT OF THE INVENTION

Figure 1:
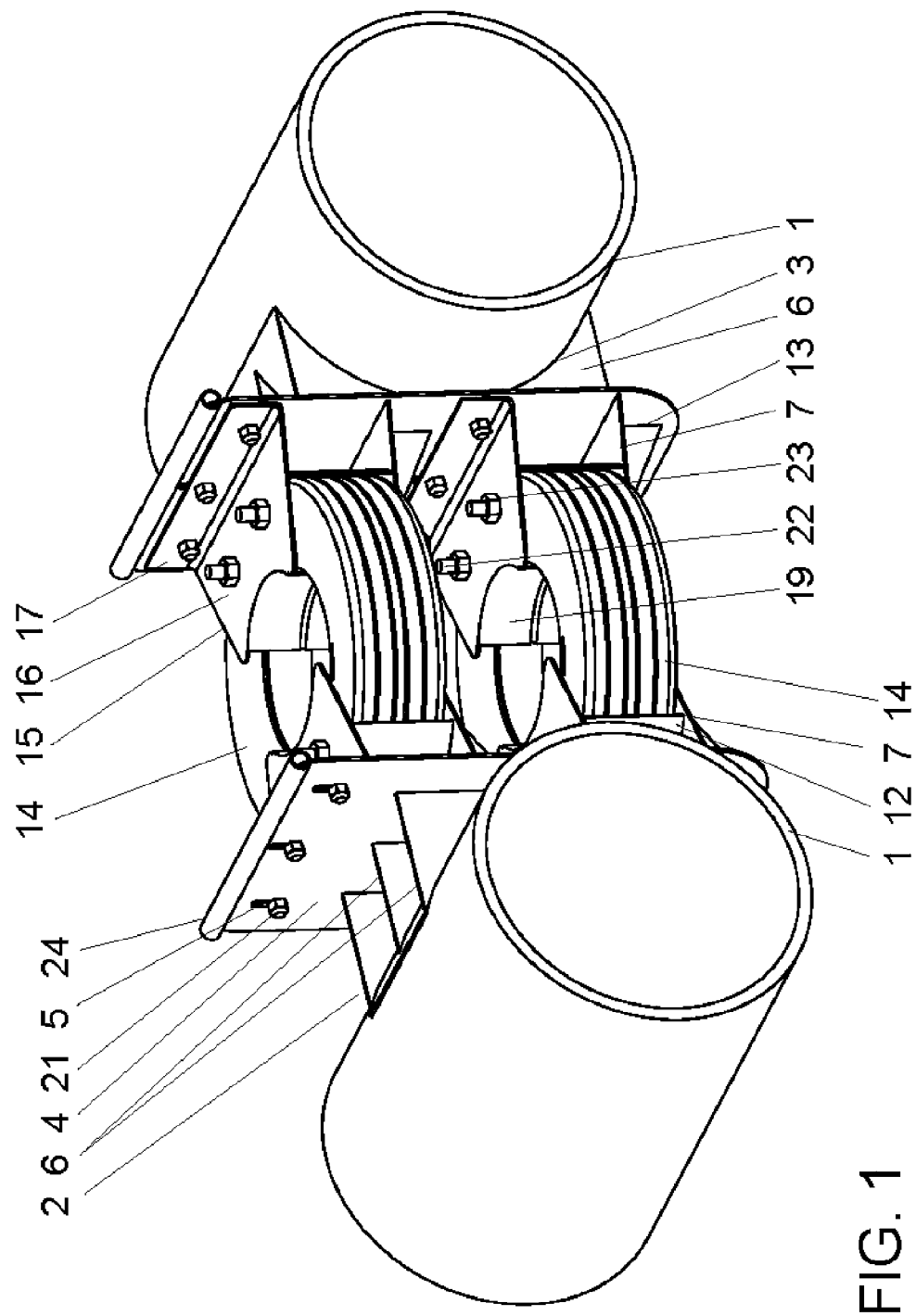
FIG. 1 is a perspective view of the shock-absorbing coupling for floating structures with all its components.

Generally and in connection with the drawings, a shock-absorbing coupling for floating structures is provided, in this embodiment particularly used as a link between the modular frames making up said structures to form mollusc breeding structures, and in which each of the two mounting bodies (2), which can be added to the structure, is made up of a rounded wall (3) to adapt itself to the rounded surface of the hollow components (1) of two frames facing each other in the structure of floating beds that can be submerged and a flat support wall (4) provided with holes (5), which are vertically elongated and arranged in two levels thereof Ribs (6) keep both walls (3) and (4) fastened.

As shown in the figures, the first gripping member (7), in a top view, is made up of a generally trapezoid-shaped plate with holes (8), with its largest side defined by a straight edge (9) that helps adapt to the flat support wall (4), the contour of its smallest side being curved-concave and vertically extended in an upward direction, making up a retention wall (10) that is finished with a horizontal retention flange (11) folded inwards into the plate (8), both (10) and (11) being intended to grip an area of the heel of the tyre (14) together with, in the example, a retention wall (12). The bottom of said first gripping member (7) shows lower ribs (13) that help connecting to the respective mounting bodies (2).

In the embodiment shown in the figures, the second gripping member (15) is made up of a plate with holes (16) with a fixing wall (17), also with holes (18), that extends vertically in an upward direction in one edge of the plate (16) and has a retention wall (19) running vertically in a downward direction on the opposite edge of the plate (16), with its contour adapted to the internal periphery of the tyre (14), ending up in a horizontal retention flange (20) folded inwards.

Conventional fastening members (21), in the example made up of bolts and nuts, keep the second gripping members (15) fastened to the support walls (4), even though if they get loose, it is possible that the former slide down onto the latter.

Figure 2:
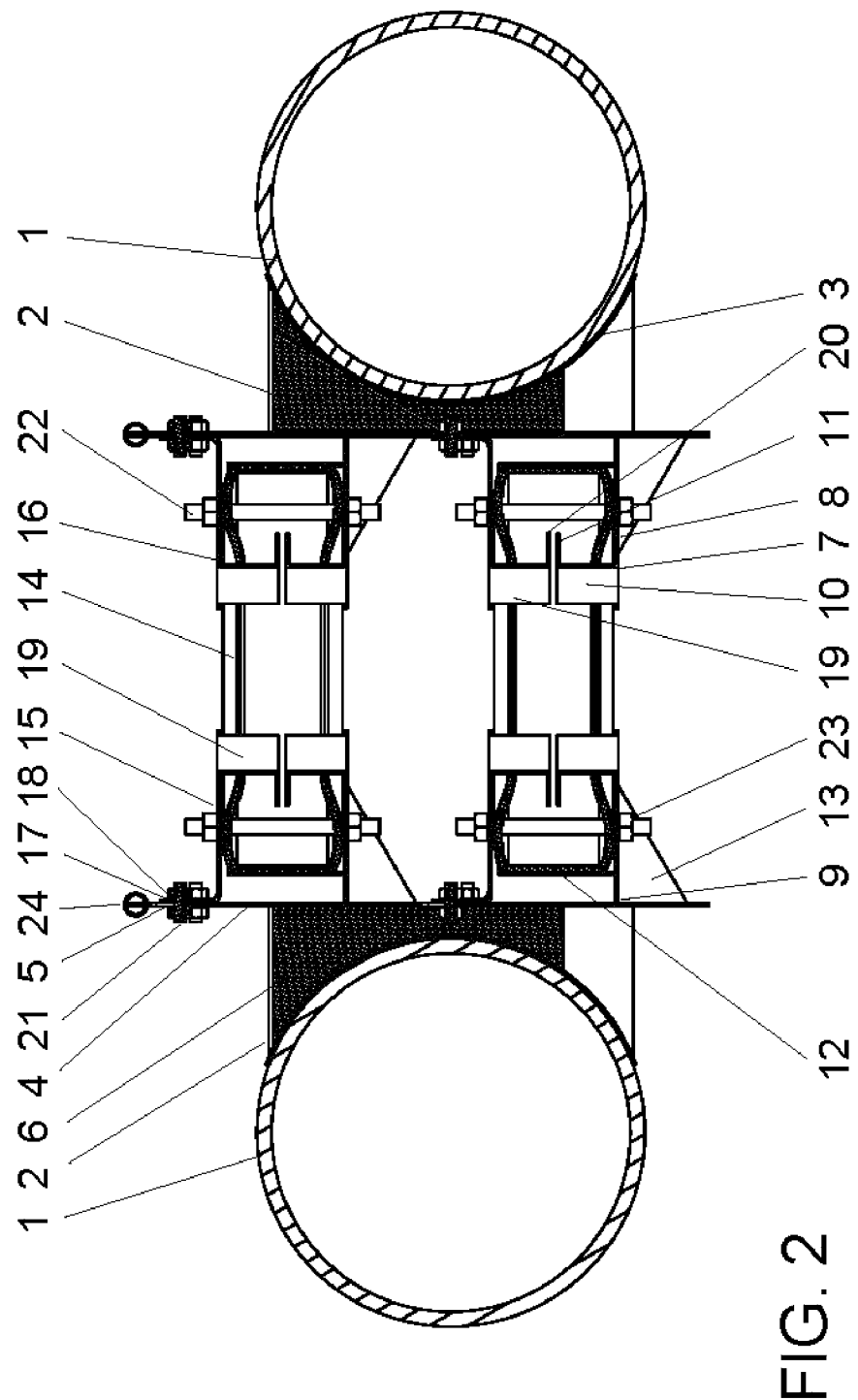
FIG. 2 is a cross-sectional view of the shock-absorbing coupling for floating structures mounted with all its components.

As it can be observed, in FIG. 2, threaded rods (22) are passed through the plates with holes (8, 16), once the tyres (14) are in place, between the first (7) and the second (15) gripping members, fastening being secured by means of nuts (23). Protection profiles (24) can be used on the sharp edges of the components of the shock-absorbing coupling.

According to the above-said, it is understood that, once the shock-absorbing couplings are mounted between the hollow components (1), beams or cross beams of two beds, or, where appropriate, of facing modules of the structure for mollusc breeding and the latter being in place for use, when the shock-absorbing couplings are not under any sea-caused force, the tyres (14) will remain at rest and unaltered. When, as a result of water agitation, the shock-absorbing coupling is compressed in the horizontal axial direction due to the thrust of the structure or a part thereof, the mounting bodies (2) get closer between the gripping members (7) and (15) and the tyres (14) will end up elastically compressed in the central region, pushed in by the retention walls (12). When the set is pull loaded, the tyres (14) stretch elastically because the gap between walls (10) and (19) of the mounting bodies (2) grows bigger. Adjustment to water movement will be absorbed by tyre (14) bending as determined by the different inclination between the mounting bodies and, therefore, of the gripping members (7) and (15) respectively fastened facing each other in the mounting bodies (2).

The invention is not limited to the embodiment shown herein, a plurality of variations within the scope of the claims being possible.

The invention claimed is:

1. A shock-absorbing coupling for floating structures comprising two mounting bodies structured for being respectively mounted on components facing each other to adjoin said components; at least one flexible body positioned between said two mounting bodies; first gripping members facing each other at a common level, and respectively being connected to one of said two mounting bodies; and second gripping members mounted and vertically slidable in a respective one of said two mounting bodies above and overlapping said first gripping members; wherein said first gripping members and said second gripping members face each other and are structured and arranged to hold said at least one flexible body in a horizontal position from which the at least one flexible body is held in two diametrically opposite regions thereof so that each of said at least one flexible body can bend, stretch or twist in a central region thereof.

2. The shock-absorbing coupling for floating structures according to claim 1, wherein said first gripping members and said second gripping members include, respectively, plates with holes, and retention walls which in a front edge, run vertically opposite to one another and end up in respective horizontal retention flanges and folded inwards; said first gripping members further comprising lower ribs capable of collaborating through connection thereof with support walls in the mounting bodies; and said second gripping members including fixing walls with holes therein to correspondingly face elongated holes in support walls of the mounting bodies.

3. The shock-absorbing coupling for floating structures according to claim 1, wherein at least one of said second gripping members is provided with at least one retention wall having a contour adapted to an external periphery of the at least one flexible body to restrain expansion of said at least one flexible body.

4. The shock-absorbing coupling for floating structures according to claim 2, wherein at least one of said second gripping members is provided with at least one retention wall having a contour adapted to an external periphery of the at least one flexible body to restrain expansion of said at least one flexible body.

5. The shock-absorbing coupling for floating structures according to claim 1, wherein said at least one flexible body is fixed in position by said first gripping members and said second gripping members through collaboration of threaded rods passing through aligned holes present in said at least one flexible body, said first gripping members and said second gripping members.

* * * * *